United States Patent

[11] 3,633,979

| [72] | Inventor | Aime Trudeau<br>227 N. E. 26th St. Apt. 6, Miami, Fla. 33160 |
|---|---|---|
| [21] | Appl. No. | 13,522 |
| [22] | Filed | Feb. 24, 1970 |
| [45] | Patented | Jan. 11, 1972 |

[54] GRAVITY-ACTUATED SELF-PROPELLING WHEEL CONSTRUCTION
1 Claim, 3 Drawing Figs.

| [52] | U.S. Cl. | 305/7 |
|---|---|---|
| [51] | Int. Cl. | B62d 55/08 |
| [50] | Field of Search | 305/7 |

[56] References Cited
UNITED STATES PATENTS

| 921,996 | 5/1909 | Jenkins | 305/7 |
| 133,605 | 12/1872 | Trenworth | 305/7 |
| 858,489 | 7/1907 | Vaughn | 305/7 |
| 1,075,664 | 10/1913 | Miller | 305/7 |
| 1,145,088 | 7/1915 | Slaght | 305/7 |

FOREIGN PATENTS

| 501,826 | 2/1920 | France | 305/7 |

*Primary Examiner*—Richard J. Johnson
*Attorney*—Ernest H. Schmidt

ABSTRACT: An annular inner wheel is arranged for planetary motion with respect to the inner periphery of an annular outer wheel of substantially greater inner diameter than the outer diameter of the annular outer wheel. The annular inner wheel is journaled with respect to a vehicle body whereby, upon the vehicle being drawn, the inner wheel can ride up within the outer wheel to impose a gravitational force therebetween aiding in the propulsion of the vehicle.

PATENTED JAN 11 1972   3,633,979

INVENTOR.
AIME TRUDEAU

GRAVITY-ACTUATED SELF-PROPELLING WHEEL CONSTRUCTION

This invention relates to wheels, and is directed particularly to an improved vehicular wheel wherein the weight of the vehicle and its load being drawn will impose a gravitational force during propulsion which aids in the pulsion of the vehicle.

It is the principle object of the invention to provide an improved vehicular wheel of the above nature wherein the vehicle and its load, instead of imposing their gravitational force directly over the rotary axis of the wheel, as in the case of ordinary wheels, impose their force somewhat forwardly thereof in the direction in which the vehicle is being is being drawn, thereby aiding in the propulsion by imparting a torsional force to the instantaneous axis of an outer wheel the outer periphery of which outer wheel rides along the ground.

More particular object of the invention is to provide a self-propelling wheel of the above nature comprising an inner wheel, and an annular outer wheel the inner diameter of which is substantially greater than the outer diameter of the inner wheel, wherein the inner wheel is constrained to mutually planetary motion within the annular outer wheel and wherein the axis of rotation of the inner wheel is adjustably fixed with respect to the vehicle body so that as the vehicle is drawn, the inner wheel will have a tendency to ride up within the outer annular wheel to shift the imposition of vehicle and load force forwardly of the instantaneous rotative axis of the annular outer wheel.

Still another object of the invention is to provide an improved wheel construction of the above nature including mechanism to shift the axis of rotation of the inner wheel forwardly or backwardly, selectively, with respect to the vehicle body as an aid in starting the rolling motion of the vehicle in its respective forward and rearward directions of travel.

Still another object of the invention is to provide an improved wheel construction of the character described which will be simple in structure, economical to manufacture, dependable in operation and durable in use.

Other objects, features, and advantages of the invention will be apparent from the following description when read with reference to the accompanying drawings. In the drawings, wherein like reference numerals denote corresponding parts in each of the several views.

Figure 1:
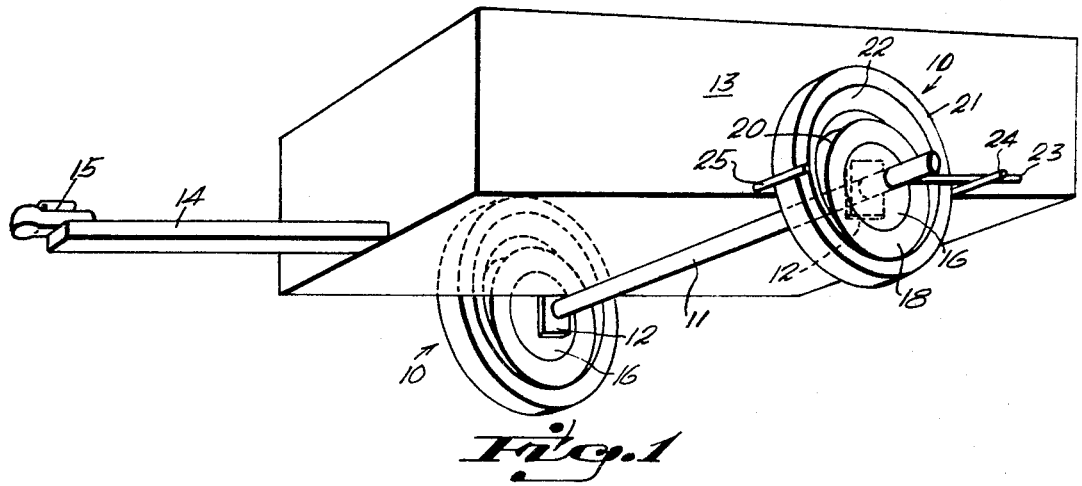
FIG. 1 is an oblique view, as seen from below, of a trailer body equipped with gravity-actuated self-propelling wheels embodying the invention.

Referring now in detail to the drawings, 10 designates a preferred form of gravity-actuated self-propelling wheel embodying the invention, a pair thereof being arranged at either end of an axle 11 journaled in a pair of journal blocks 12 for rollingly supporting a trailer body 13, by way of example of usage. The trailer body 13 is equipped with the usual forwardly extending tongue 14 terminating in a coupler device or hitch 15 for attachment to a towing vehicle.

Each self-propelling wheel 10 comprises a circular hub 16 having an eccentrically located side-to-side opening 17 through which the axle 11 extends and to which said hub is affixed, as by welding, for movement in unison therewith as an integral structure.

Figure 2:
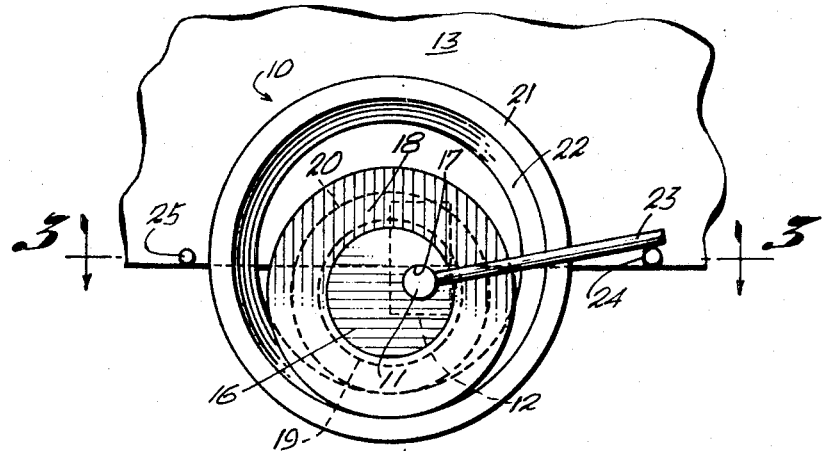
FIG. 2 is an outside elevational view of one of the wheels, together with a fragmentary portion of the trailer body.
Figure 3:
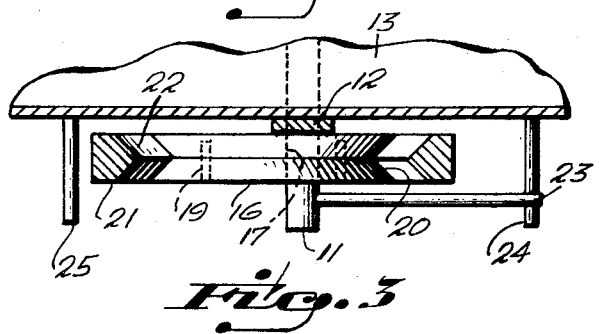
FIG. 3 is a horizontal cross-sectional view taken along the line 3—3 of FIG. 2 in the direction of the arrows.

Circumjacently journaled about the outer periphery of the hub 16 is an annular inner wheel member 18, said inner wheel, preferably, being journaled by an interfitted annular needle bearing, indicated at 18, for free-turning motion of said inner wheel about said hub in use. The annular inner wheel 18 has its outer peripheral edge formed with a V-shaped groove 20. An outer annular wheel 20, the inner diameter of which is substantially greater than the outer diameter of the annular inner wheel 18, is formed with a V-shaped inner wall portion 22, complemental in shape with that of the V-groove 20 of the annular inner wheel 18. As best illustrated in FIGS. 2 and 3 the inner and outer annular wheels 18 and 21, respectively, are arranged in coplanar disposition, with the V-shaped inner wall portion 22 of said outer wheel riding in the V-groove 20 of said annular inner wheel. Caging means, not illustrated, will preferably be used to maintain the annular inner and outer wheels 17 and 21 in relatively coplanar disposition. For simplicity of illustration, however, such caging means, being of well known and ordinary construction, is not further described herein.

Means is provided for shifting the axis of symmetry of the hubs 16 at each end of the axle 11 between forward and rearward positions with respect to the trailer body 13. To this end, a shift rod 23 affixed to an outer end portion of the axle 11 and extending in the radial direction with respect thereto, is provided. The shift rod 23 is fixed to the axle 11 in spaced relation with respect to its associated wheel 10, and is adapted to but a forward stop member 24 extending outwardly of the trailer body 13 at a position to the rear of the trailer body, and a reverse stop member 25 extending outwardly of the trailer body 13 at a position to the front of the trailer body.

In operation, upon starting to tow the trailer body 13 by means, for example of an automotive vehicle (not illustrated) to the rear of which the hitch 15 is connected, the shift rod 23 will be turned from the reverse position, i.e., from the position of abutment with the reverse stop member 25, to the position of abutment with the forward stop member 24, as illustrated. It will be understood that such movement of the shift rod 23 serves to move the associated hubs 16 somewhat forwardly with respect to the trailer body 13, whereupon the coaxial annular inner wheels 18 will tend to ride up within the forward portions of their associated annular outer wheels 21. As a result, the application of weight of the trailer will be shifted upwardly from the very bottom of the annular outer wheel 21, forcing said outer wheel to turn in the forward direction. Such turning of the outer annular wheels 21 serve to impell the trailer body forwardly until rest position obtains again, whereat the vertical diameters of the annular inner and outer wheels 18 and 21 will be coincident.

However, during the time that the annular outer wheel 21 begins to move forwardly as described above, the towing vehicle will have pulled forwardly on the axle 11 to continuously maintain the annular inner wheel 18 at a relatively forward and upward position with respect to and within said annular outer wheel, whereat the load or weight of the trailer will be able to exert, through force of gravity, its forward-impelling influence. Since the application of trailer load or the weight force will remain somewhat forward of the vertical plane to ground from the centers of the hubs 16, any tendency of the bottom portion of the annular outer wheels 21 to press into the road surface along which the trailer is travelling will be minimized, and rolling friction thereby reduced. In this connection it will be noted that the invention is particularly well suited to use in travelling over soft road surfaces, such as soft dirt or mud.

Operation of the wheels 10 in reverse travel of the trailer will be substantially the same as described above in connection with forward travel, differing only in that upon starting backward movement the shift rod 23 will be turned from the forward position, as illustrated, to the reverse position whereat it will be in abutment with the reverse stop member 25.

While I have illustrated and described wheels embodying the invention used in association with a trailer cart, it is to be understood that such use is for simplicity of description only, and that the invention could be applied as well to other rolling vehicles, whether designed for self-propulsion, towing, or pushing. For example, the invention is also particularly well suited for use as the front wheel of an ordinary wheelbarrow. A wheelbarrow thus equipped can more readily be pushed over soft ground or the like without bogging, especially when carrying heavy loads such as wet concrete, for example. The invention, in brief, comprehends all the embodiments and modifications coming within the scope and spirit of the following claims.

What I claim as new and desire to secure by Letters Patent is:

1. A gravity-actuated, self-propelling wheel comprising, in combination, a circular hub, an annular inner wheel circumjacent to said circular hub and rotatively journaled thereon, an annular outer wheel the inner diameter of which is greater than the outer diameter of said annular inner wheel, said annular inner wheel being arranged in coplanar disposition within said annular outer wheel, and means interacting between said annular inner wheel and said annular outer wheel for constraining said annular inner wheel to planetary movement within said annular outer wheel, an axle, a vehicle body, said axle being rotatively journaled with respect to said vehicle body, said axle being perpendicularly disposed with respect to said hub and being eccentrically affixed thereto, mechanism for rotating said axle, selectively, between two rotative positions with respect to said vehicle body for moving said annular inner wheel in translation with respect to said vehicle body, said annular inner and outer wheel interacting means comprising a track in the form of a V-shaped groove in the outer periphery of said annular inner wheel and a V-shaped inner wall portion about the inner periphery of said annular outer wheel and seatable in said V-shaped groove, said axle rotating mechanism comprising a shift rod extending radially outwardly of said axle and a pair of stop members affixed to and extending outwardly of said vehicle body at each side of said annular outer wheel, said stop members serving as limiting abutments for said shift rod.

* * * * *